United States Patent
Patels et al.

[11] 3,751,589
[45] Aug. 7, 1973

[54] SYSTEM FOR DERIVING TELEVISION SIGNALS FROM HOLOGRAPHIC AND NON-HOLOGRAPHIC RECORDS

[75] Inventors: Gottfried Patels; Erich Beck, both of Vienna, Austria

[73] Assignees: Karl Vockenhuber; Raimund Hauser, both of Vienna, Austria

[22] Filed: Oct. 26, 1970

[21] Appl. No.: 83,773

[30] Foreign Application Priority Data
Nov. 28, 1969 Austria .................... A 11162/69

[52] U.S. Cl...... 178/5.4 R, 178/5.2 D, 178/DIG. 28
[51] Int. Cl. ................................... H04n 9/02
[58] Field of Search .................. 178/5.4 CR, 6.7 A, 178/5.2, 6, 6.5, DIG. 28, 6.8, 5.4 ST; 350/3.5; 352/123

[56] References Cited
UNITED STATES PATENTS
| | | |
|---|---|---|
| 2,292,307 | 8/1942 | Warner et al. .................. 178/6.8 |
| 3,585,284 | 6/1971 | Macouski ........................ 178/5.4 ST |
| 3,522,371 | 7/1970 | Goldmark ....................... 178/5.4 CD |
| 3,511,553 | 5/1970 | Gerritsen et al. ............... 350/3.5 |
| 3,532,431 | 10/1970 | Bryugdahl ...................... 350/3.5 |

Primary Examiner—Richard Murray
Attorney—Ernest G. Montague

[57] ABSTRACT

Image-forming means for producing in an image plane a first image, which is derived from a holographic record, comprise a source of monochromatic light for illuminating a holographic record disposed in a predetermined second plane, and a first optical system for deriving said image from the light from said holographic record thus illuminated. The system comprises image-presenting means, which serve to provide a second image from a non-holographic record and television signal-producing means which comprise a television camera for deriving television signals from said image in said image plane and said second image.

19 Claims, 6 Drawing Figures

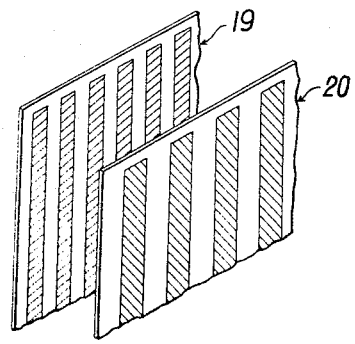
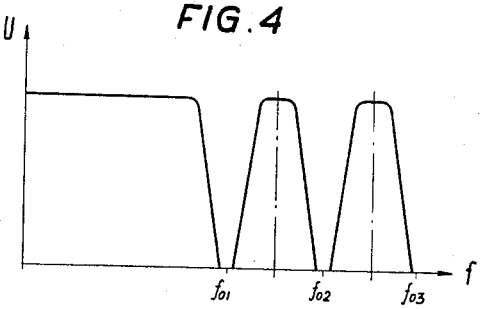
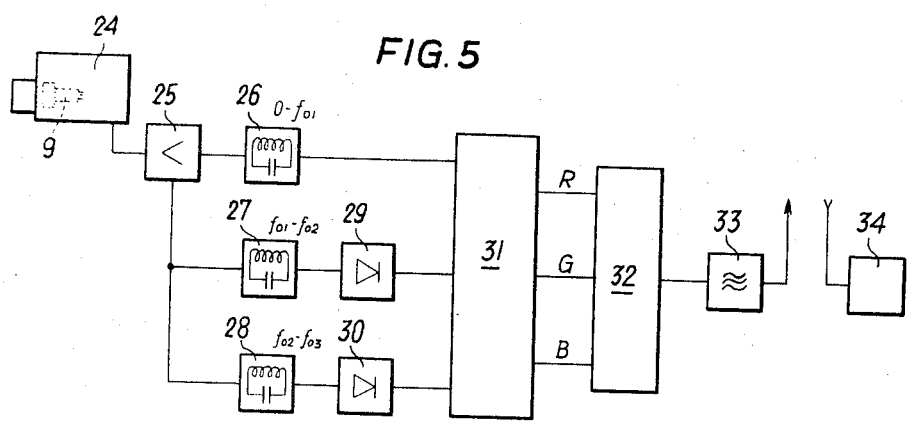
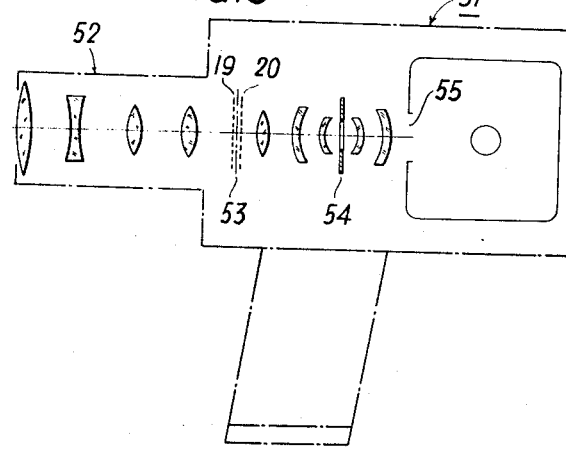

SYSTEM FOR DERIVING TELEVISION SIGNALS FROM HOLOGRAPHIC AND NON-HOLOGRAPHIC RECORDS

This invention relates to a television system for reproducing hologram records, particularly cinematographic hologram records, which system comprises a source of monochromatic light, preferably coherent light, and a television camera for televising the image which has been produced by the reconstruction of the hologram.

Processes have been disclosed in which objects or photochemical records of two-dimensional images are recorded in the form of holograms by means of a coherent monochromatic light, particularly laser light. Intensity or phase holograms may be used for this purpose. Because phase holograms consist of a film surface which has been deformed into a relief, it is very simple to copy such records on highly inexpensive embossable materials by means of a suitable embossing die. For this purpose, it has already been proposed to provide an electroplated nickel coating on a phase hologram, to strip the resulting metallic negative from the original hologram and to use that negative in embossing plastics material sheeting. This die can be used to make large numbers of copies on inexpensive plastics material. A suitable illumination of the holograms made by such process with monochromatic light will result in a formation of an image of the original object. This monochromatic image is suitably converted into electric signals by means of a television camera and then displayed by a black-and-white television receiver.

For a reproduction of colored images by this process, the color information related to the object to be represented must be stored and transmitted in coded form. In the process described above, this is accomplished in that two of the three primary colors are converted by respective selective color line screens into line patterns and the image containing coded color information is recorded on holographic film, which thus contains the brightness information of the image whereas the color information is recorded in the form of lines. The spacing of the lines represents the hue and the intensity of the lines represents the saturation. A suitable television camera and suitable signal-decoding means may be used to recover the two primary colors and, with the aid of the brightness signal, also the third primary color so that the original color image can be displayed by a color television receiver.

This system has advantages residing in the use of an inexpensive record carrier and an inexpensive copying process and, owing to the high redundance of the hologram, in a high insensitivity to optical interference on the film, but has also the disadvantage that holographic recording involves a high expenditure so that such motion pictures cannot be made by an amateur whereas motion pictures on photochemical film can be made without difficulty.

It is an object of the invention to provide a system by which phase holograms made by a quantity copying process as well as films or pictures made by photochemical methods can be scanned for display by a television receiver. This object is accomplished according to the invention in that an image carrier, particularly a photochemical image carrier, or an image derived from such image carrier, is disposed in the image plane of the image which has been derived from the hologram, or in a plane which is equivalent to said image plane.

In a preferred embodiment of the invention, a system of the kind described hereinbefore comprises a television camera tube or the like, a lens for reproducing on the light-sensitive surface of the camera tube the image derived from the hologram, a mirror, which is disposed in the light path associated with said lens between the same and the light-sensitive surface and is partially transmitting and/or removable from the path of rays, and an additional lens, which faces said mirror and is adapted to reproduce on the light-sensitive surface an image recorded on the preferably photochemical image carrier or an intermediate image thereof simultaneously or in alternation with the reproduction of the image derived from the hologram.

In another embodiment of the invention, a mirror is disposed in the path of light associated with said lens between the hologram and the lens and is partially transmitting and/or removable from the path of light so that the common lens can reproduce on the light-sensitive surface the image derived from the hologram, or the image recorded on the image carrier or an intermediate image derived from the latter image, in dependence on the position of the mirror and the illumination of the hologram.

For use with holograms on which coded color information signals are recorded in such a manner that a luminance signal is associated with a first frequency range and primary color signals are associated with at least two, particularly narrow, frequency ranges, an embodiment of the invention comprises two color line screens for respective primary colors, which screens are disposed in the light path associated with the lens for reproducing an image recorded on the preferably photochemical image carrier and in an image plane of said lens and serve to produce coded information representing the colors of the particularly photochemical image, and the spatial frequencies of said screens agree with the spatial frequencies of the coded color information signals associated with the respective primary colors and recorded on the hologram. The colors may be recorded in coded form on the photochemical film. For this purpose, the camera or a printer may be provided in an image plane or an intermediate image plane with at least two color line screens associated with respective primary colors and having different spatial frequencies. Such arrangement may be used to take color photographs on black-and-white film. When such images are televised with the system according to the invention, the color line screens may be omitted because the corresponding modulation is recorded on the film.

Some embodiments of the invention will now be explained more fully and by way of example with reference to the drawing.

FIG. 3 is an enlarged view showing in perspective the two color line screens.

FIG. 4 is a diagram representing the frequency spectrum of the video signal produced by the television camera.

FIG. 5 is a block circuit diagram of the reproducing system and

FIG. 6 is a diagrammatic view showing the optical system of a camera for producing images with coded color information on photographic film.

Figure 1:
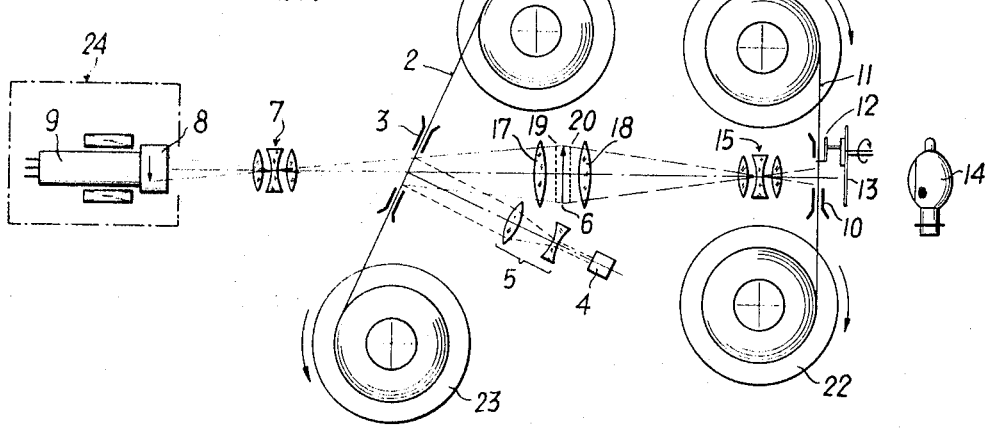
FIGS. 1 and 2 are diagrammatic views showing two embodiments of a system for scanning holographic and photochemical films.

A supply reel 1 carries a coil of film 2, which consists of a transparent sheeting of plastics material. A relief-like phase hologram has been embossed into said sheeting. The film 2 is moved through a film gate 3 and illuminated by a laser diode 4. The laser diode 4 is succeeded by a lens 5, which produces a beam of light having the desired cross-section. Because the wave fronts are deformed at the phase hologram, an image is derived therefrom, which is indicated at 6 in FIG. 6. A lens 7 transforms said virtual image into an image on the light-sensitive surface 8 of a camera tube 9. Because each surface element of the hologram contains the entire image information of the two-dimensional original, the hologram film can be moved in its longitudinal direction without a displacement of the virtual image 6. During a transition from one frame to the next, there is a gradual change to the succeeding virtual image. It is peculiar to the holographic film that it can be advanced without need for an intermittent film transport or an optical compensation or a shutter. The film gate 10 of a motion picture projector for substandard film is provided on the optical axis of the lens 7 of the television camera. A photochemical film 11 is intermittently moved past said projector aperture by a pull-down claw 12, which is diagrammatically shown. A revolving shutter 13 covers the projector aperture during each transport step. A lamp 14 with a condensing mirror is provided to illuminate the film. A lens 15 produces in the plane of the virtual image 6 an image of the image recorded on the film which is in the film gate 10. Two field lenses are indicated at 17 and 18. Two color line screens 19 and 20 are disposed in the plane of the image 6; their function will be explained more fully hereinafter. The photochemical film 11 is fed to the system from a film supply reel 21 and is wound up in the system on a take-up reel 22. The take-up reel for the holographic film is indicated at 23. The two take-up reels 22 and 23 may be driven by a common drive motor. To facilitate the operation of the system, the supply reels 1 and 21 and, if desired, the take-up reels 23 and 22, may be accommodated in a cartridge.

The image 6 derived from the hologram is monochromatic and contains coded color information. This information results on the camera tube in an intensity line pattern depending on the hue and saturation of the colors. During the reproduction of a color film 11, the color line screens 19 and 20 convert the colors on the film into coded color information which is similar to that on the hologram.

The processing of the signals and the color decoding will now be described with reference to FIGS. 3, 4, and 5. The process which has been described can transmit only intensity variations so that the color information must be converted into intensity variations. For this reason, the bandwidth which is available is utilized for brightness information only in the frequency range up to $f_{01}$ in FIG. 4 and the frequency ranges $f_{01}$-$f_{02}$ and $f_{02}$-$f_{03}$ are used for information representing the two color separations. The two color separation signals are used to modulate respective carriers by means of two line screens 19 and 20 (see also FIG. 3). The spatial frequencies of said screens determine the color carrier frequencies. The line screens 19 and 20 consist of an alternation of transparent strips and of strips which inhibit the respective color separation and result in a line pattern in the colored portions of the image. In this way, color information can be transformed into a brightness modulation in which the frequency represents hue and the amplitude represents saturation. For a clearer showing, the two line screens 19 and 20 are shown axially spaced apart. To ensure a high image quality, the two line screens 19 and 20 should be disposed in the plane of the image 6 with an axial spacing which is as small as possible. In FIG. 1, the two line screens 19 and 20 consist of absorbing line screens. When used in a suitably changed optical system, these line screens may consist of reflecting line screens.

The image formed on the light-sensitive surface 8 of the camera tube is televised. The brightness signal produced by the television camera 24 is amplified by an amplifier 25 and the frequency of the amplified signal is limited by a first filter 26 at the frequency $f_{01}$ so that the luminance signal appears at the output of the filter 26. The two filters 27 and 28 serve to recover the two color carriers, which are demodulated in demodulating stages 29 and 30. The luminance signal and the two color signals are then supplied to the matrix 31, in which the third color separation can be recovered from these two color signals and the brightness signal. The three color signals may control a television receiver 34 directly or by means of a high-frequency transmitter 33, which transmits coded color information in accordance with a national standard.

The system shown in FIG. 1 is extremely simple in operation. When it is desired to reproduce a holographic film, the supply reel 1 is inserted into the system and the holographic film 2 is threaded into the system. This threading may be automatic. To start the operation of the system, the laser diode 4 and the means for driving the take-up reel 23 are energized. Because there is no need for an intermittent transport of the film nor for an optical compensation, a reproduction at normal speed, fast speed or slow speed or a standstill projection are enabled simply by the selection of the speed of the reel 23. When it is desired to show a motion picture which has been recorded on photochemical film with a normal motion picture camera for substandard film, the holographic film 2 is removed from the appliance and a supply reel 21 carrying the photochemical film is inserted into the appliance. When the film has been threaded and the intermittent film transport mechanism and the lamp 14 have been energized, an aerial image of the film 11 is produced in an image plane 6, which is a conjugated plane to the holographic film plane in gate 3. aerial image is produced in the plane of the image 6. The light from this aerial image passes through the film gate 3 for the holographic film to the lens 7, which reproduces the aerial image on the light-sensitive surface 8 of the camera tube. The two mechanisms for transporting the films 2 and 11 may be provided with known means for automatically rewinding the film on the supply reel when the entire length of film has been transported.

Figure 2:
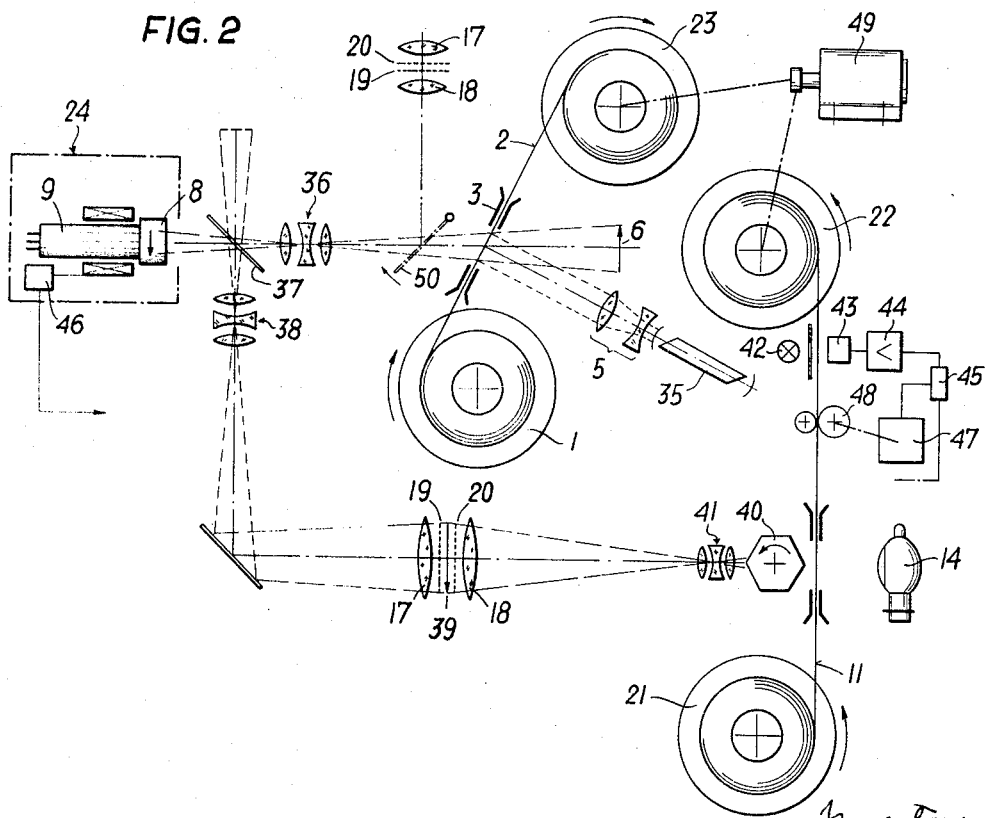

FIG. 2 shows a modification of the reproducing appliance represented in FIG. 1. Like parts are designated with like reference characters. The embodiment of FIG. 2 differs from that of FIG. 1 in that the hologram in the film gate 3 is illuminated by a gas laser, e.g., a helium-neon laser. The cross-section of the laser beam is increased as in FIG. 1 by a lens 5. A virtual image 6 is derived from the hologram. A lens 36 reproduces said virtual image 6 on the light-sensitive surface 8 of the camera tube 9. A partially transmitting mirror 37 is disposed between the lens 36 and the camera tube 9 and faces a lens 38, which reproduces on the light-sensitive surface 8 of the camera tube an aerial image 39, which is produced by a motion picture projector for substandard film. This projector differs from that of FIG. 1 in that it has means for a continuous transport of the film. Means for compensating the shifting of the image comprise a rotating six-sided glass prism 40. A real aerial image is produced in the plane 39 by a lens 41. An illuminating system 42 which faces the perforations of the film 11 is provided to synchronize the film transport with the deflecting frequency of the television camera 24. The light passing through the film perforations is received by a photoconductor 43. The output signals from the photoconductor are amplified in an amplifier 44 and the amplified signals are supplied to a phase comparator 45, which is also fed with the deflecting voltage from a vertical sweep circuit 46. In case of a difference in frequency or phase, a corresponding correcting signal is supplied to a motor 47 for driving a film transport sprocket 48. Within the scope of the invention, common drive means may be used to transport both films 11 and 2, and the regulating device 45 may also be used for both films. A motor 49 is operable to drive both take-up reels 22 and 23.

To minimize the light output of the gas laser 35 required for an operation of the system, the partially transmitting mirror 37 is suitably coated so that it has only a relatively low reflection factor, e.g., of 10 percent, so that it transmits a major portion of the light along a straight line (about 90 percent in the above-mentioned example). For a change from a reproduction of the holographic film to a reproduction of the photochemical film or vice versa, either the projection lamp 14 and the corresponding film transport mechanism are energized or the gas laser 35 and the means for transporting the film 2. The image information on both films may be combined if both illuminating systems are energized at the same time. Such combination may be desirable for fading in additional information, such as titles etc.

FIG. 2 illustrates another alternative, in which a hinged mirror 50 rather than a mirror 37 is disposed between the lens 36 and the film gate 3 for the hologram film. This embodiment has the advantage that the lens 38 may be omitted. For a change from one mode of operation to the other, the mirror is swung into or out of the light path. Alternatively, this mirror could also have a partially transmitting coating and consist of a stationary mirror, which is disposed in the light path and has a partially transmitting coating.

In the embodiments shown in FIGS. 1 and 2, the photochemical film 11 contains the color information in three different layers of the photochemical emulsion. The novel system also enables a colored reproduction of black-and-white films which contain coded color information. FIG. 6 shows a camera 51 for recording on such color films. The camera comprises a lens 52, which produces an intermediate image in a plane 53. An image in the image plane 55 is derived from the intermediate image by an inverting optical system 54. Color line screens 19 and 20 similar to those used in the embodiments shown in FIGS. 1 and 2 are disposed in the image plane 53 and convert the color information into a brightness modulation at a frequency which represents hue and with an amplitude which represents saturation. In a system for reproducing the films on which color information has thus been recorded, the color line screens 19 and 20 are omitted because the corresponding frequency modulation is recorded on the film. In this case too, the line frequencies of the color line screens 19 and 20 in the camera 51 must be equal to the corresponding color code frequencies of the holographic record. To enable a reproduction of normal color films as well as of black-and-white films on which coded color information is recorded, the two color line screens 19 and 20 are removable from the light path of the image-forming system in a preferred embodiment of the invention.

The invention is not restricted to the examples which have been described hereinbefore and which are shown in the drawings. For instance, a normal incandescent lamp or a gas discharge lamp may be used to illuminate the hologram. A monochromasy and coherence which is sufficient for deriving an image from the hologram can be obtained in that light from the lamp is directed to a slit which passes only a suitably narrow beam, which is filtered in a succeeding band pass filter. In this case, the lamp 14 for illuminating the photochemical film may be used also to illuminate the hologram. To ensure a high resolution, it is desirable to use monochromatic light having a short wave-length. Where laser diodes or solid lasers are used, a pulsed control thereof may be desirable. In this case, the pulse frequency should be so high that a bright-dark modulation is not apparent on the television screen.

The appliance may be arranged to show transparencies rather than cinematographic holographic and photochemical films and a change between different modes of operation is also possible in this case. For instance, cinematographic holographic films and photochemical still films can be reproduced simultaneously or in alternation.

What is claimed is:

1. A system for producing television signals representing holographic and photographic records, which system comprises a source of monochromatic light, means arranged in a first plane and for holding a holographic record at least partly in said first plane: said source of monochromatic light being arranged to illuminate said holographic record in said first plane to derive an image from said holographic record in a first image plane, a first image forming system defining a first optical axis, said first image plane being arranged on said optical axis, said first image forming system projecting said image in said first image plane into a second image plane, a second image forming system defining a second optical axis, said first and second optical axis coinciding at least partly, means for holding a non-holographic record arranged on said second optical axis, said non-holographic record having at least one frame aligned by said holding means with said second optical axis, illuminating means aligned with said second optical axis to illuminate at least one frame of said non-holographic record, said second image forming system projecting an image of said non-holographic record illuminated by said illuminating means from a third image plane which is conjugated to said first image plane into said second image plane, and television signal-producing means including a television camera for deriving television signals representing the respective image in said second image plane.

2. A system as set forth in claim 1, wherein said holding means for said non-holographic record are located in said first image plane.

3. A system as set forth in claim 1, further comprising a third image forming system arranged on said second optical axis between said holding means for said non-holographic record and said second image forming means to project an image of said non-holographic record illuminated by said illuminating means into said third image plane.

4. A system as set forth in claim 1, in which said first and second optical axis coincide only partly, said system further comprising a mirror arranged on the crossing point of both axes to produce coincidence of both axes, said mirror for permitting transmission of light along one of said axes and to reflect light along the other of said axes to said second image plane.

5. A system as set forth in claim 4, in which said mirror is a partially transmitting mirror.

6. A system as set forth in claim 4, in which said mirror is removable out of said path of light from said one lens to said light-sensitive surface.

7. A system as set forth in claim 1, in which said source of monochromatic light and said illuminating means are operable alternately.

8. A system as set forth in claim 1, in which said source of monochromatic light and said illuminating means are simultaneously operable.

9. A system as set forth in claim 1, which comprises means for moving a cinematographic holographic record in said first plane.

10. A system as set forth in claim 1, in which
a first film transport mechanism for moving a cinematographic holographic record film in said first plane,
a second film transport mechanism for moving a cinematographic non-holographic record film, and
common drive means are provided for said first and second film transport mechanisms.

11. A system as set forth in claim 1, in which
said illuminating means comprise a source of non-monochromatic light, which is operable to illuminate said non-holographic record and
said source of monochromatic light comprises an aperture for receiving light from said non-monochromatic source and to pass only a narrow beam of light, and a narrow-band filter for receiving said narrow beam and for transmitting monochromatic light to said holographic record.

12. A system as set forth in claim 1, in which said filter is adapted to transmit light in the short-wave portion of the spectrum.

13. A system as set forth in claim 1, for deriving television signals from holographic records which comprise coded color information, which includes luminance information in a first spatial frequency range and primary color information in at least two spatial frequency ranges, and from colored non-holographic records, in which system said second image-forming means comprise a lens for producing a image in a plane, and at least two color line screens for producing coded color information associated with the primary colors represented by said primary color information recorded on said holographic records are disposed in the plane of said second image, and said color line screens have spatial frequencies which lie respectively in said two spatial frequency ranges of said coded color information recorded on said holographic records.

14. A system as set forth in claim 13, for producing television signals from holographic records which comprise coded color information in which said spatial frequency ranges associated with said primary color signals are narrower than said first spatial frequency range.

15. A system as set forth in claim 13, in which said television signal-producing means comprise means for deriving television color information signals from said coded color information recorded on said holographic records and from said coded color information produced by said color line screens.

16. A system as set forth in claim 13, for producing television signals also from non-holographic records which comprise coded color information including a luminance signal in a first spatial frequency range and primary color signals in at least two spatial frequency ranges, in which system
said color line screens are removable from the light path of the system,
said television signal-producing means comprise means for scanning said images in said second image plane, and
said spatial frequency ranges are selected so that the frequency ranges of the television color information signals derived from said non-holographic records by said television signal-producing means are the same as the corresponding frequency ranges of said television color information signals derived from said holographic records.

17. A system as set forth in claim 1, for deriving television signals from holographic records which comprise coded color information which includes luminance information in a first spatial frequency range and primary color information in at least two spatial frequency ranges, and from non-holographic records which comprise color information which includes luminance information in a first spatial frequency range and primary color information in at least two spatial frequency ranges, in which system
said television signal-producing means comprise means for scanning the images in said second image plane, and
said spatial frequency ranges are selected so that the frequency ranges of the signal derived from said non-holographic records by said television signal-producing means are the same as the corresponding frequency ranges of the signals derived from the coded color information recorded on said holographic records.

18. A system as set forth in claim 17, for deriving television signals from holographic records which comprise coded color information in which said spatial frequency ranges associated with said primary color signals are narrower than said first spatial frequency range.

19. A system as set forth in claim 18, in which said television signal-producing means comprise means for deriving television color information signals from said coded color information recorded on said holographic records and from said coded color information recorded on said non-holographic records.

* * * * *